(12) United States Patent
Wang et al.

(10) Patent No.: US 8,176,793 B2
(45) Date of Patent: May 15, 2012

(54) METHOD TO ESTIMATE THE EFFECT OF WELD LOCATION ON WELD STRENGTH

(75) Inventors: Pei-Chung Wang, Shanghai (CN); Samuel P. Marin, Oakland Township, MI (US); Sheila A. Marin, legal representative, Oakland Township, MI (US); Daniel C. Hutchinson, Goodrich, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 12/333,567

(22) Filed: Dec. 12, 2008

(65) Prior Publication Data

US 2009/0152245 A1 Jun. 18, 2009

Related U.S. Application Data

(60) Provisional application No. 61/013,294, filed on Dec. 12, 2007.

(51) Int. Cl.
*G01N 3/20* (2006.01)

(52) U.S. Cl. .......................................... 73/850; 73/760
(58) Field of Classification Search ................... 73/760, 73/850
See application file for complete search history.

(56) References Cited

U.S. PATENT DOCUMENTS

| | | | | | |
|---|---|---|---|---|---|
| 3,986,391 | A | * | 10/1976 | Vahaviolos | 73/781 |
| 4,305,096 | A | * | 12/1981 | Yokoshima et al. | 348/90 |
| 4,591,689 | A | * | 5/1986 | Brown et al. | 219/124.34 |
| 4,712,722 | A | * | 12/1987 | Hood et al. | 228/104 |
| 5,304,774 | A | * | 4/1994 | Durheim | 219/121.83 |
| 5,329,091 | A | * | 7/1994 | Bissinger | 219/121.83 |
| 6,178,819 | B1 | * | 1/2001 | Smartt et al. | 73/622 |
| 7,104,125 | B2 | * | 9/2006 | Harthorn et al. | 73/152.57 |

* cited by examiner

*Primary Examiner* — Max Noori (57) ABSTRACT

A method to diagnose a failed weld in a welding process includes monitoring a location of a weld created on a plurality of work pieces, diagnosing the weld as a failed weld based on said location with respect to a closest edge of one of the work pieces, and identifying said failed weld based on the diagnosing.

17 Claims, 6 Drawing Sheets

METHOD TO ESTIMATE THE EFFECT OF WELD LOCATION ON WELD STRENGTH

CROSS REFERENCE TO RELATED APPLICATIONS

This application claims the benefit of U.S. Provisional Application No. 61/013,294 filed on Dec. 12, 2007 which is hereby incorporated herein by reference.

TECHNICAL FIELD

This disclosure relates to welding processes.

BACKGROUND

Resistance welding is a known process whereby electrical current is passed between two electrodes. Work pieces to be joined, usually made of metallic pieces, are placed between the electrodes, a clamping force is applied to the electrodes, and current flowing between the electrodes passes through the work pieces. The electrical resistance in and between the work pieces, when exposed to the current, creates heat sufficient to locally melt the work pieces. The molten portions of the work pieces are allowed to cool, creating a welded joint between the work pieces.

Spot welding is a known type of resistance welding. It frequently involves two substantially circular copper electrodes that come close to each other, leaving a gap for work pieces to be inserted therebetween. As current is applied, the circular electrodes create a circular weld pattern to the work pieces. Common techniques utilize a series of spot welds to join pieces along a flange.

Other types of, or combinations using, resistance welding are known. Weld-bonding is one technique wherein resistance welding is combined with a structural adhesive to complementarily affix one component to another. Projection welding is another technique wherein a projection is utilized to, at least initially, localize the current flow between work pieces in order to create precise weld geometries and reduce the impact of welding temperatures on the rest of the work pieces away from the joint.

Joint strength or the ability of the joint to experience stress is a property which can be affected by many factors. Stress experienced by two work pieces at a welded joint can take many forms, including axial stress, shear stress, torsional stress, and bending moment. The relationship of stress to strain and the resulting predictable failure for a work piece of known geometry and material properties is well known in the art. Factors influencing joint strength include weld geometry, weld spacing, weld quality, and properties of the work pieces such as material composition and thickness. The appropriate locations and properties of welds along a joint may be determined experimentally, empirically, predictively, through modeling or other techniques adequate to accurately predict reactions of the work pieces to the application of stress. However, variability in welding processes can cause weld locations to change from one set of work pieces to the next. Weld locations affect weld strength and weld quality, impacting how a force applied to the work pieces translates into stresses and resulting strains upon the welds. As a result, weld location variability is important to joint strength.

SUMMARY

A method to diagnose a failed weld in a welding process includes monitoring a location of a weld created on a plurality of work pieces, diagnosing the weld as said failed weld based on the location with respect to a closest edge of one of the work pieces, and identifying the failed weld based on the diagnosing.

BRIEF DESCRIPTION OF THE DRAWINGS

One or more embodiments will now be described, by way of example, with reference to the accompanying drawings, in which.

DETAILED DESCRIPTION

Figure 1:
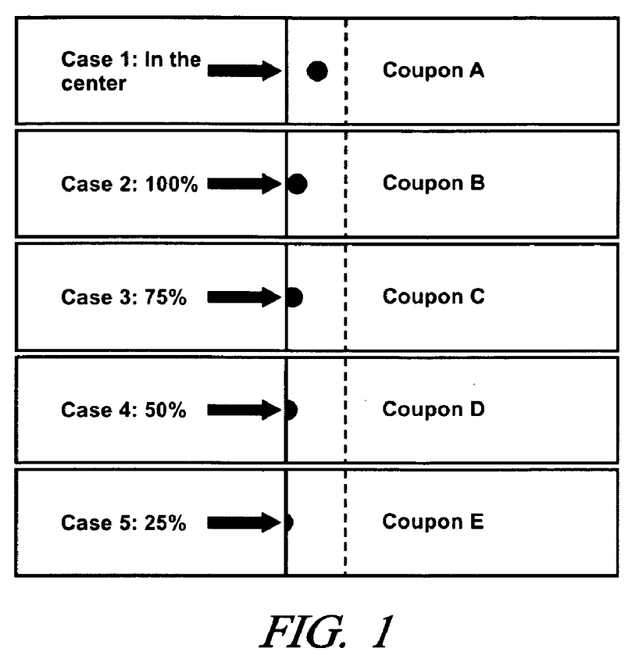
FIG. 1 is an illustration of various exemplary coupons displaying spot welds in different locations of an overlap in accordance with the present disclosure.

Referring now to the drawings, wherein the showings are for the purpose of illustrating certain exemplary embodiments only and not for the purpose of limiting the same, FIG. 1 illustrates a series of work pieces with spot welds in different locations in accordance with the disclosure. As mentioned above, manufacturing process variability can lead to weld location variability, affecting resulting joint strength. Each sample or coupon includes two flat work pieces situated to create an overlap. A spot weld is positioned on each overlap in order to create a joint between the work pieces. Coupon A describes case 1, in which the spot weld is located in the center of the overlap. Coupons B through E illustrate cases 2 through 5, displaying edge welds or welds which contact the edge of the overlap. The percentages indicated denote the percentage of weld area of the intended circular weld effected on the samples in the overlap. The migration of welds as illustrated all moved toward the left, but it will be appreciated that a weld would just as equally be considered an edge weld if it existed tangential to or overlapping with the dotted line representing the edge of the lower work piece to the right of center.

The production of effective resistance welds is a well known art. Welding engineering includes known methods, procedures, and best practices known to produce welds of appropriate strength and quality. Engineering mechanics includes known principles regarding the study of forces acting upon a work piece, the resulting internal stresses upon the work piece, and the associated strain or deformation experienced by the work piece. Materials engineering includes known principles regarding strength of materials, strength of metallic objects resulting from molten metals cooling at certain rates and in certain environments, and the compatibility of materials to be welded together. Principles and techniques involved in creating proper welds are well known, and will not be explored in detail herein. For the purposes of this disclosure, it is assumed that proper welding practices have been employed, and that the welds applied in all exemplary embodiments have been created through known methods.

Figure 2:
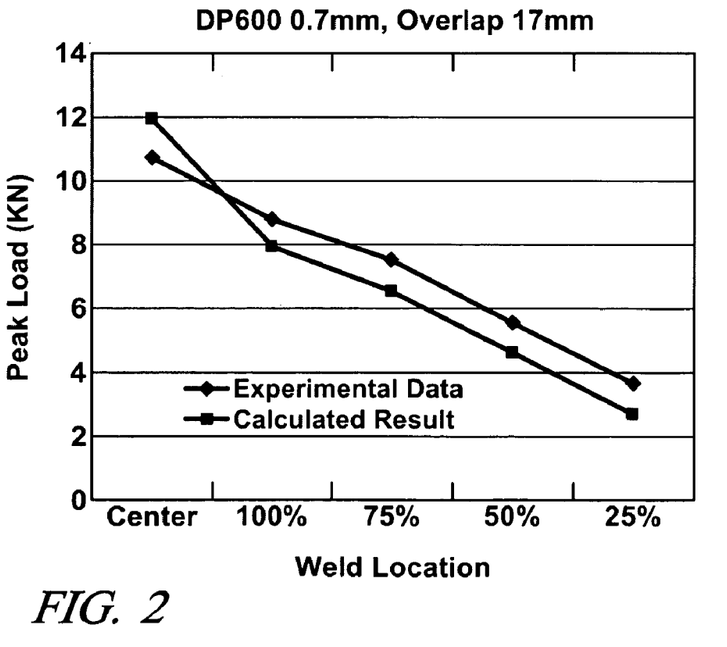
FIG. 2 is a graphical representation of exemplary test results describing peak load tested on sample work pieces against weld location with respect to an overlap in accordance with the present disclosure.

FIG. 2 illustrates test results displaying joint strength data for a series of coupons with different weld locations, in accordance with the present disclosure. Experimental data is displayed against data predicted by computer analysis of models of the work pieces. A comparison of the data shows strong correlation of a trend indicating that a spot weld located in the center of the overlap has the highest strength, with consistently or approximately linearly decreasing weld strength as first the weld is moved tangentially next to the edge and then is steadily reduced over the edge as described in the coupons of FIG. 1.

Figure 3:
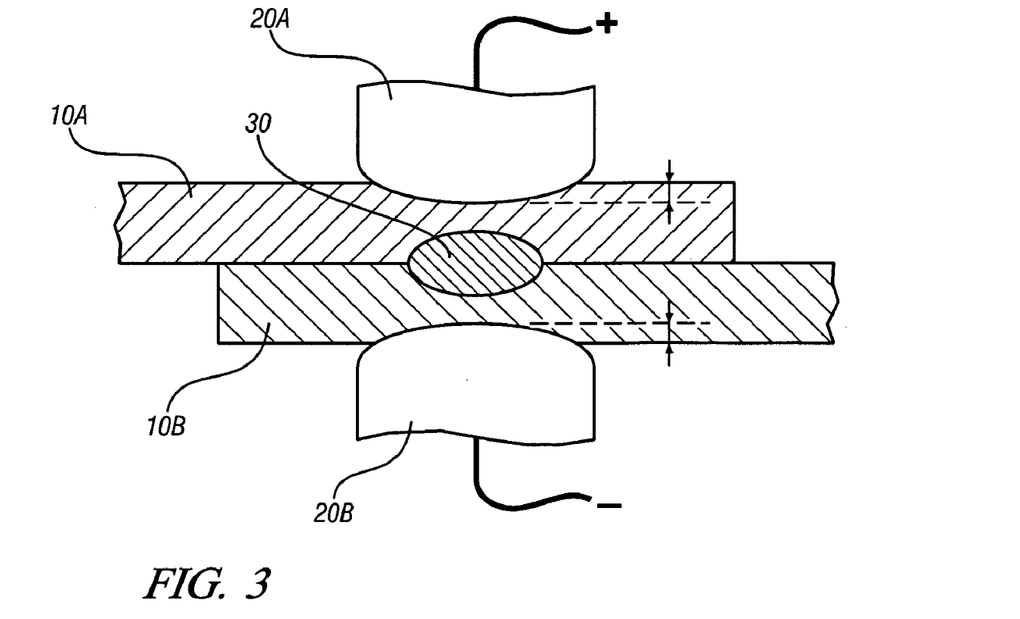
FIG. 3 is a sectional representation of an exemplary weld located in the center of an overlap in accordance with the present disclosure.

FIG. 3 illustrates a sectional view of two work pieces being resistance welded together in the center of an overlap in accordance with the present disclosure. Work pieces 10A and 10B in this exemplary embodiment are flat pieces with main sections projecting off in opposite directions. It should be appreciated that the welding techniques described herein and the work pieces described can take many embodiments and are not intended to be limited to the specific examples illustrated herein. For example, the two edges could be lined up, and the main bodies of work pieces 10A and 10B could extend off in the same direction. The resistance welding technique used in the method can take many forms, including spot welding, weld bonding, and projection welding. Many forms of resistance welding are known, and specific details of each will not be described herein. Electrodes 20A and 20B describe exemplary tools which would be used to pass a current through the work pieces to create a weld. Weld 30 represents the combination of material originally from work pieces 10A and 10B melted into a single mass, which when cooled becomes the weld joint between work pieces 10A and 10B. As electrodes 20A and 20B come into contact with work pieces 10A and 10B, the current flowing through the work pieces softens the material, and a clamping force applied to the electrodes in combination with the softened material in the work pieces causes an indentation to form on each of the work pieces. The flat planes of material surrounding the electrodes and the resulting weld provide stability and maintain the orientation of the molten and softened material to the surrounding work pieces.

Figure 4:
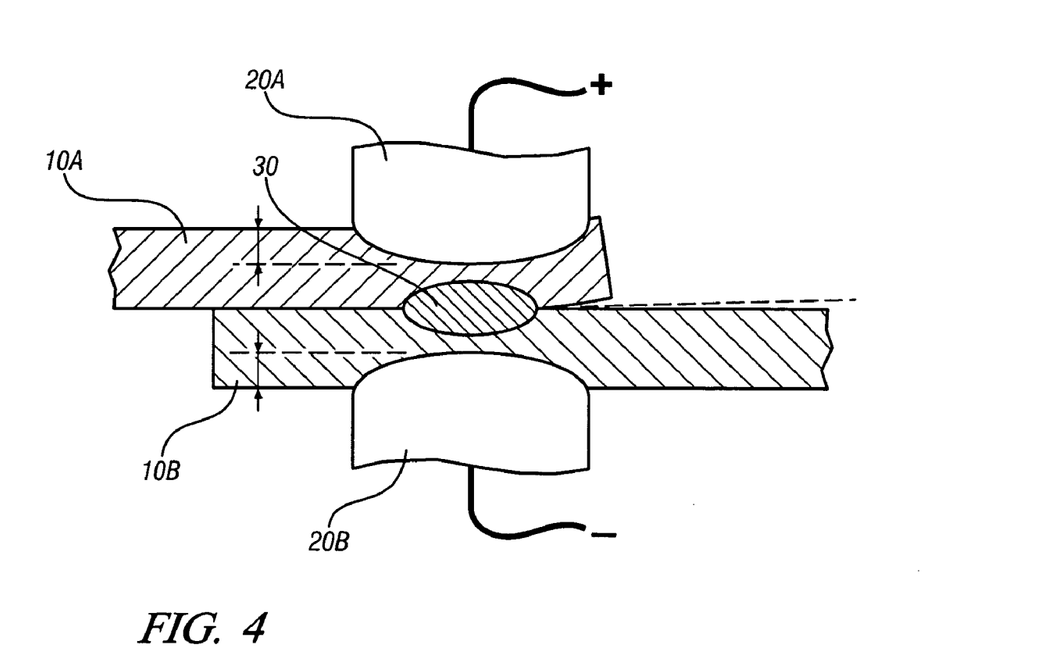
FIG. 4 is a sectional representation of an exemplary weld located in proximity to the edge of a work piece in accordance with the present disclosure.
Figure 5:
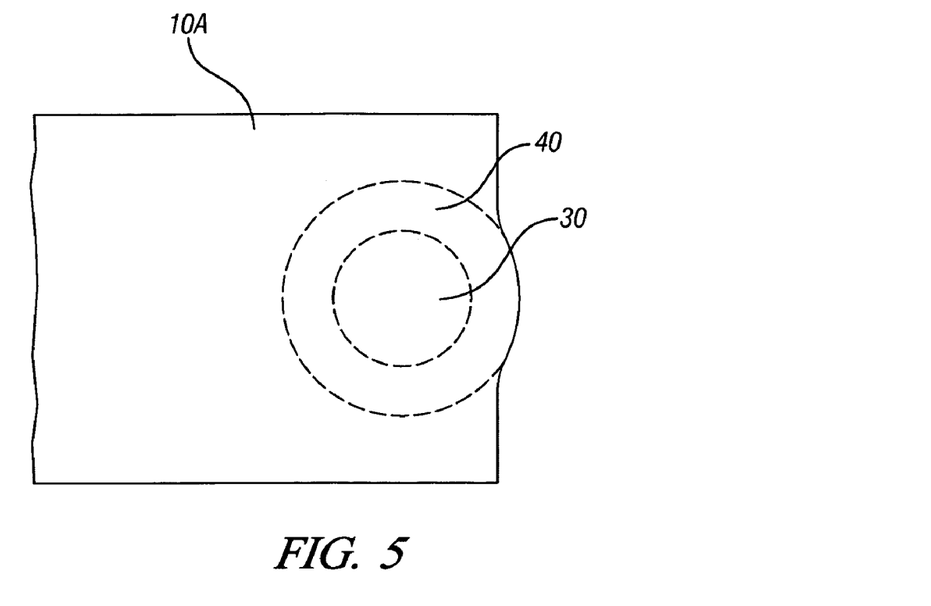
FIG. 5 is an illustration of an exemplary work piece as affected by a weld in proximity to the edge of the work piece in accordance with the present disclosure.

FIG. 4 illustrates a sectional view of two work pieces being resistance welded together close to an edge of an overlap in accordance with the present disclosure. As shown in FIG. 3, electrodes 20A and 20B come into contact with work pieces 10A and 10B. As current passes through the work pieces, the material softens, weld 30 is created, and the soft material in combination with a clamping force applied to the electrodes causes an indentation to form on each of the work pieces. However, where in the exemplary embodiment of FIG. 3, the flat planes of material surrounding the electrodes and the resulting weld provided stability for the molten material of the weld to stay in place, the proximity to the electrodes and of the weld to the edge of work piece 10A creates instability where softened or molten material from the work pieces can deform outwards past the edge. Results of this deformation can be seen in FIG. 5, where a top view of work piece 10A after the welding process is illustrated in accordance with the disclosure. As mentioned above, the effects of the current applied and the clamping force of the electrodes, in combination with the proximity to the edge of the work piece, causes instability in the material of the work piece. FIG. 5 shows how weld 30 and a softened material area 40 react to being open to the edge of work piece 10A, where as the material of the work piece changes from a solid to some degree closer to a liquid, the material is pushed out of its normal position past the edge of the work piece. Returning to FIG. 4, the instability in the material of the work pieces caused by the weld in close proximity to the edge allows material to move away from the electrodes that would in the center of an overlap be kept in place. This movement of material leads to less material remaining between the electrodes and around the resulting weld, causing increased indentation thickness and deformation in the resulting alignment of the work pieces. The resulting weld 30 is weaker and leads to the experimental and calculated results described in FIG. 2.

Figure 6:
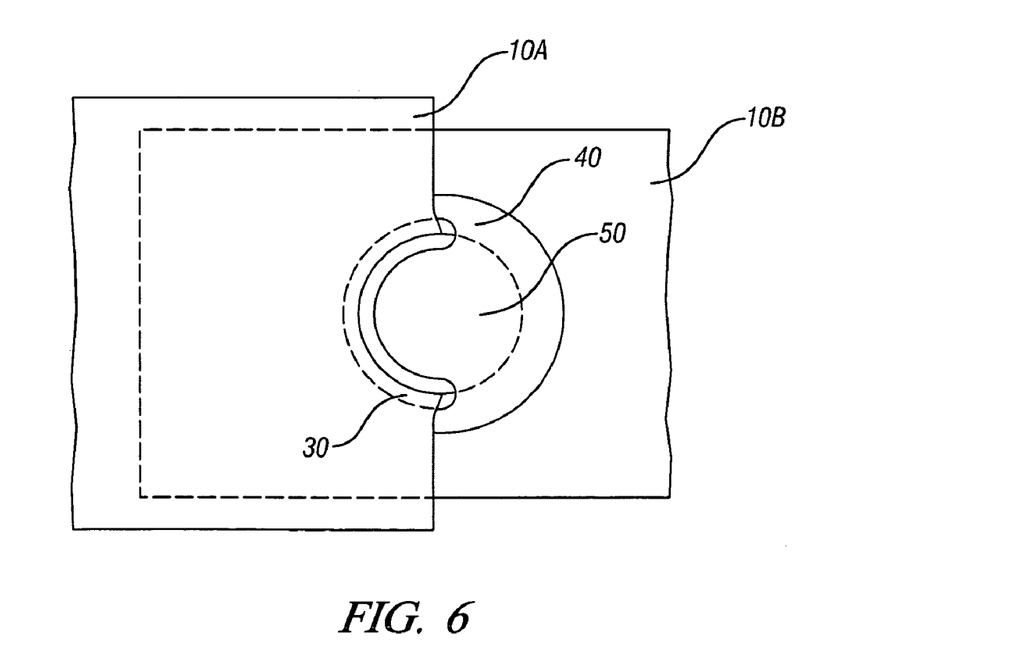
FIG. 6 is an illustration of exemplary work pieces as affected by a weld overlapping the edge of one work piece in accordance with the present disclosure.

The exemplary embodiment of work pieces 10A and 10B described in FIGS. 4 and 5 were in close proximity or tangential to the edge, as in coupon B illustrated in FIG. 1. As the electrodes 20A and 20B and the resulting weld 30 move past the edge of a work piece, as described in coupons C, D, and E of FIG. 1, instability in the softened material and the molten material of the weld increases. FIG. 6 illustrates an exemplary embodiment of a spot weld resulting from electrodes lined up partially off the edge of work piece 10A in accordance with the present disclosure. As in the exemplary embodiment described in FIGS. 4 and 5, material from work piece 10A, placed between a pair of electrodes and welded together through application of a current, has deformed and extended past the original edge of work piece 10A. Material from work pieces 10A and 10B has melted together to form weld 30, however, in this exemplary embodiment some of the material originally part of work piece 10A, has escaped from the weld area and has either been left as non-functional weld residue 50 or has been expelled in the welding process. Those having ordinary skill in the art will appreciate that the reduction in area of weld 30 and the large amount of material lost to the non-functional weld residue 50 or expelled reduces the strength of the resulting weld joint in comparison to the welds illustrated in FIGS. 3 and 4. As the alignment of the electrodes goes further off the edge of the work pieces, the weld strength will continue to decrease as the resulting quality of weld 30 decreases.

Figure 7:
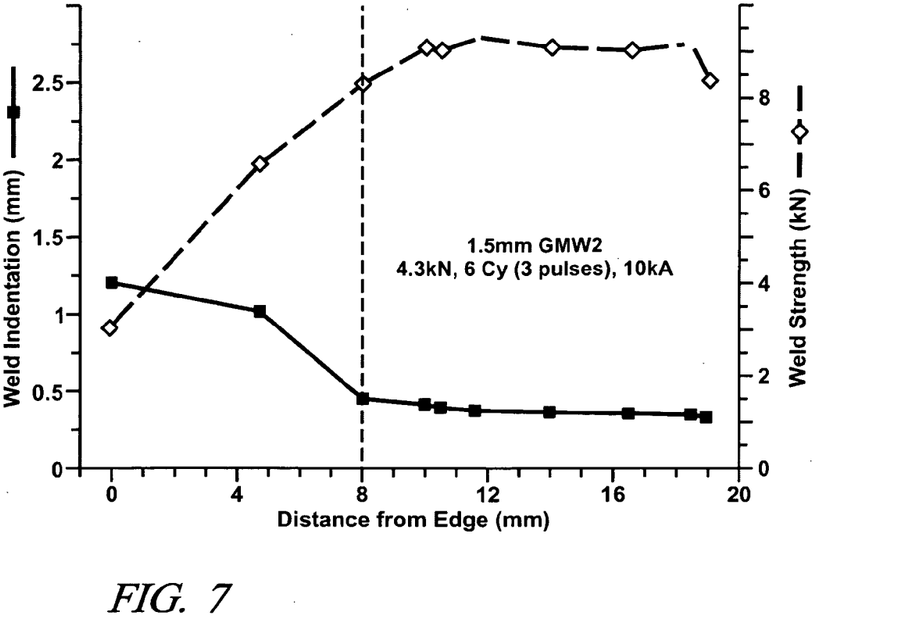
FIG. 7 illustrates exemplary test results showing a relationship of distance from the edge of a work piece to resulting weld strength in accordance with the present disclosure.

FIG. 7 illustrates exemplary test results showing a relationship of distance from the edge of a work piece to resulting weld strength in accordance with the present disclosure. Distance from the edge of the work piece in this particular exemplary test is measured from the center of the electrode to the edge. So long as the distance from the edge of the work piece maintains a minimum distance where the softened and molten material remains contained in a stable plane of material, the weld indentation and resulting weld strength remain relatively stable. However, a point can be seen in the data around 8 mm and lower from the edge, where the weld indentation sharply rises and the weld strength decreases precipitously. As described above, the proximity of the electrodes and the resulting weld to the edge of the work piece creates instability and decreases the quality of the resulting weld. This graph demonstrates a strong correlation between distance from the edge and resulting weld strength. Utilizing such a graph, resulting weld strength can be compared to weld strength required of the resulting weld, and a minimum distance from the edge can be determined based upon required weld strength.

Figure 8:
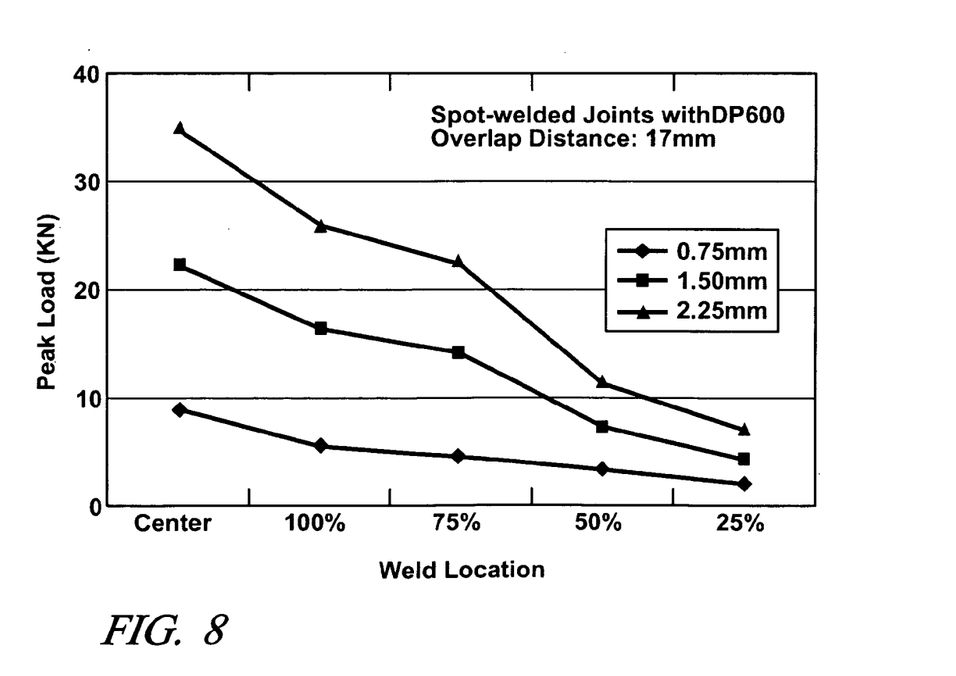
FIG. 8 graphically illustrates an exemplary effect of weld location on weld strength, including exemplary experimental results indicating for different coupon thicknesses, in accordance with the present disclosure.

Testing of various samples based upon weld location, coupon thickness, and material and work piece properties can be useful to determining and enabling prediction of an effect of these properties on weld integrity. FIG. 8 graphically illustrates an effect of weld location on weld strength, including exemplary experimental results indicating for different coupon thicknesses, in accordance with the present disclosure. The results include properties for DP600 steel coupons spot welded upon samples with an overlap of 17 mm. Experimental testing of weld samples show a strong trend in weld location-to-weld strength correlation across all exemplary gages. As initially illustrated in FIG. 2, the trend lines in FIG. 8 clearly indicate that a spot weld located in the center of work piece overlap has the highest strength, with consistently or approximately linearly decreasing weld strength as the weld is moved tangentially next to the edge, and then is steadily reduced over the edge as described in the coupons of FIG. 1. FIG. 8 displays the effects of material gage or thickness on the relationships described in FIG. 7 as the weld location moves from the center of the piece toward the edge. This location-dependant weld characteristic is present in all exemplary work pieces of varying gages.

In production practice when the equivalent plastic strain of a resistance weld spot reaches the ultimate strain or plastic strain of the work piece steel, the weld is regarded as a failure.

Based upon empirical test results and known part behaviors, a relationship between weld strength, coupon thickness, and weld location for an exemplary part sample can be represented through the following equation:

$$P = 0.163 \cdot CT^{0.136} \cdot 4.338^{WL} \qquad [1]$$

P describes weld joint strength (kN). CT describes coupon thickness (mm). WL describes weld location (% edge weld). The exemplary equation was derived by welding controlled sample parts with varying weld locations and testing the weld joint strength by loading the parts to failure. It should be noted that such an equation can be developed experimentally, empirically, predictively, through modeling or other techniques adequate to accurately predict weld formation and resulting weld strength.

Figure 9:
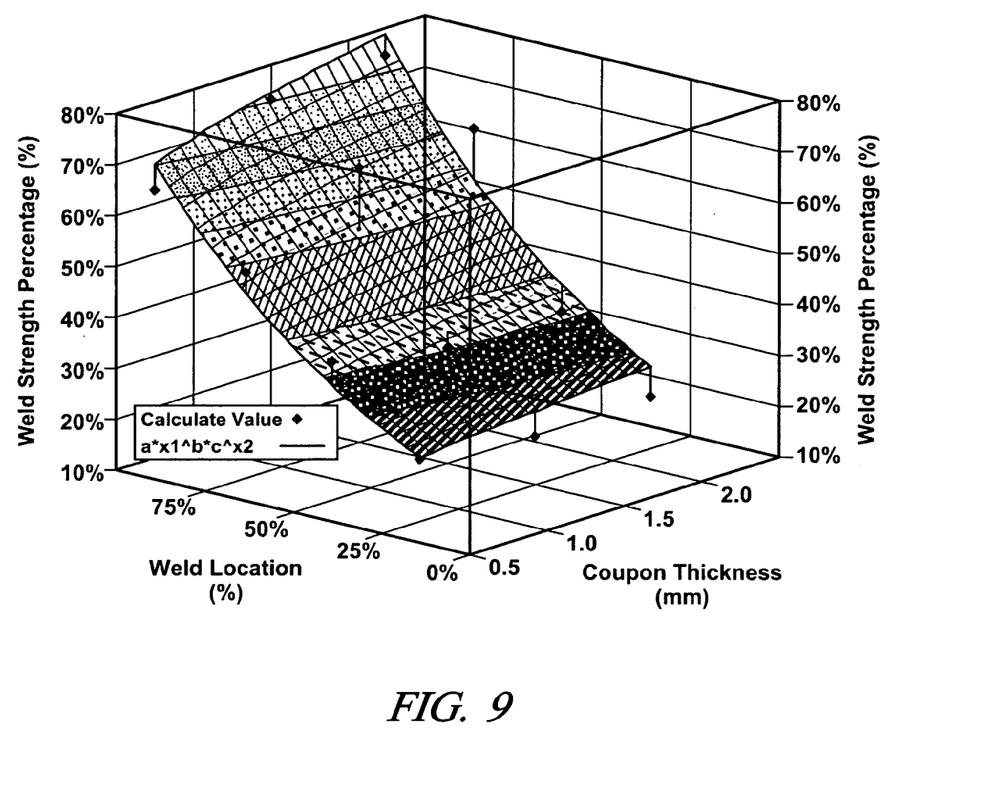
FIG. 9 is a graphical representation describing an exemplary calculated relationship between weld location, work piece or coupon thickness, and weld strength, in accordance with the present disclosure.

FIG. 9 graphically depicts exemplary data calculated according to the above exemplary equation and illustrating in three dimensions weld location (X-axis), coupon thickness (Z-axis), and weld strength (Y-axis), in accordance with the present disclosure. The individual points illustrated include data points predicted according a model based on the above equation. The 3D data depicts a surface fitted to the individual points. It should be noted that the numbers utilized in the above equation are exemplary and specific to a particular set of samples including DP600 steel coupons spot welded upon samples with an overlap of 17 mm. Different values can be similarly developed for samples with different properties according to test results and modeling techniques known in the art. Weld strength is shown as a percentage derived from the ratio:

$$\frac{\text{Strength of Edge Weld Joint}}{\text{Nominal Strength of an Ideal Weld}}$$

The resulting 3D surface or output of an equivalent model can then be utilized to predict weld strength based upon weld location and coupon thickness.

Equations utilized in the diagnosis of welds based upon distance from the edge of the work piece can take additional forms. Equation 1, described above, assumes material properties consistent with the samples modeled. For example, the material utilized and the yield strength inherent to the material affect the strength of the resulting weld of the work piece. Testing can be utilized to determine weld strength on various parts with different material properties. Yield strength indicates the stress, or force per unit of cross-sectional area, required to cause failure in the part. Welds of exemplary work pieces with different yield strengths can be tested and analyzed to determine a relationship of peak load (PL) or peak force that the work piece can sustain to coupon thickness, weld location, and yield strength of the coupons. An exemplary equation developed from test data resulting from an exemplary nominal spot weld in the center of a 17 mm overlap area can be expressed by the following:

$$PL = 0.228 \cdot CT^{1.076} \cdot YS^{0.671} \qquad [2]$$

Further, an exemplary equation developed from test data resulting from a spot weld in various locations in a 17 mm overlap area, resulting in a weld location percentage as described above, can be expressed by the following:

$$PL = 0.0372 \cdot CT^{1.212} \cdot YS^{0.671} \cdot 4.338^{WL} \qquad [3]$$

In this way, test samples can be taken to derive an equivalent relationship to Equation 3 for a particular set of samples, and the resulting equation, exemplified by Equation 3 but changing for the test particular test parts utilized, can be used to predict PL for an examined work piece given known YS and CT based upon WL. Using such a predictive equation, a method is disclosed to determine the success or failure of a resistance weld based on in-process comparison of predicted peak load to a threshold failure peak load.

While there exists evidence of strong correlation between distance from the edge of the work piece and resulting weld strength, parts created in the welding process can be complicated, large, and unwieldy. The size and orientation of the work pieces may make taking measurements from the weld location to the closest edge difficult. Also, as described above, the weld can move close to different edges of the work pieces. The exemplary embodiments described above were simple planes with straight edges, however, work pieces in practical applications are frequently complex, employ curved or complex shapes, and variability in the manufacturing process can move in many directions. However, the effect of moving close to an edge of a work piece upon the strength of the weld will remain steady. Understanding this characteristic is important to production processes as a discrepant weld of this type might weaken critical welds, induce greater stress concentrations, and therefore degrade the structural performance of the welded part.

A method is disclosed to diagnose a failed weld based upon a strength of the resulting weld. Strength of the resulting weld can be determined based upon comparison of the location of the weld to an edge of a work piece. Location of a weld on the work piece or work pieces can be compared to a design or a nominal location on the work pieces. Such a comparison of the location of the weld to an accepted or nominal location for the weld and comparison to a threshold maximum distance can yield a determination of the weld as an edge weld or a suspect weld. Alternatively, location of a weld on the work piece or work pieces can be compared to known safe zones on the work piece. Alternatively, accounting for geometry of the work pieces, edge zones on the work pieces can be defined or proximity to a closest edge of a work piece can be evaluated and compared to location of a weld on the work pieces. The work pieces can be modeled, for example in a 3D modeling system, and the model compared with 3D location data for each weld by methods known in the art. Such 3D modeling can allow dynamic determination of a closest edge of the work pieces to the identified weld location and diagnosis based upon comparing the distance to a threshold minimum distance. In the alternative, each weld process can utilize a look-up table of similar data referencing devices to compare location data for the weld to acceptable and not acceptable locations. Data can be utilized on a weld by weld basis, or overall weld strength of the joined work pieces can be comprehensively diagnosed according to an estimated strength of the various welds performed. Alternatively, strength of the resulting weld can be determined or predicted based upon location the weld. Such prediction of strength of the weld can be based upon predetermined calculations based upon the methods described above. Alternatively, such prediction of the strength of the weld can be based upon computational modeling known in the art, factoring such inputs as material properties and predicted geometry of the resulting weld, utilizing known methods such as finite element analysis. This predicted strength of the resulting weld can then be compared directly to a required strength of the weld. Comparison of location data can, therefore, be embodied by a comparison of the weld location to a threshold or critical location or by a comparison of predicted weld strength based on weld location to a threshold required weld strength. In this way, location of the weld on a set of work pieces can be utilized to diagnose the integrity or resulting strength of the weld.

While the exemplary processes illustrated above were spot welds, the methods described below may work equally well in welds of different shapes and configurations, and are not intended to be limited merely to resistance spot welds. Welds of non-circular or larger geometry might require multiple measures of weld location or weld strength to apply the methodology described herein.

As described above, weld strength is location dependant, and this correlation exists in work pieces of differing gages. Therefore, as long as the work piece base material and its ultimate strain value is known, a weld can be determined a success or failure by knowing its location in relation to nearby work piece edges and coupon thickness, and utilizing the formulas such as developed above. By considering each component that is to be built in a production line, identifying the grade of steel and the gage of the parts that are to be welded together, and determining the ultimate strain value for each, a minimum allowable threshold strength value for each edge weld can be determined. Such a minimum allowable threshold strength value can be utilized directly to compare to a predicted peak load or can be used to define critical locations of the welds, as described above. Weld strength criteria can be made available to weld stations in a production environment to allow online diagnoses of weld success or failure, and potential prescribe a repair process, on work pieces as they are being processed. The data can be stored at the weld station in an onboard non-volatile memory device, in a remote computer memory location, or on a network server. Information can be organized by part type, part configuration, process step, or any other grouping deemed logical by one skilled in the art of production engineering. The data can be stored in a lookup table or production database accessible automatically by processing equipment in the weld station, or manually by a production operator. In one exemplary embodiment, an exemplary weld station with ten assigned weld operations can have a look-up table entry for each individual weld operation, assigning weld location criteria calibrated to and based upon the particular work piece specifics for that operation. Any method to access the data as edge welds are being identified and evaluated online is applicable to the method described in the present disclosure. In this way, corrective action may be taken at the particular affected weld station, and minimize impact on downstream weld or build processes.

Exemplary steps to gather data regarding weld location and process the information to diagnose weld integrity are disclosed. The location of a weld must be identified to implement the present weld diagnosing method. First, weld location with respect to the work pieces involved must be ascertained. Such locations can be determined by any of a number of methods known in the art. For example, a machine vision system known in the art can be utilized to monitor weld locations with respect to the assembled work pieces. In addition, such a system can approximate the alignment of the various work pieces to aid in determination of the location of the weld to each of various part edges. Alternatively, physical probes indexing the work pieces and the location of the weld or location of the welding machinery at the time of the weld can be used to ascertain location of the weld. Alternatively, behavior of the welding machinery can be used to ascertain properties of the weld achieved. As described in association with FIG. 7, weld indentation thickness for a given sample changes based upon distance from the edge of the work pieces. According to any known method, location of the weld upon the work pieces is ascertained. Second, the distance of the weld from relevant work piece edges must be determined. Distance of the weld from the edges can be determined by ascertained weld location data, known geometry of the work pieces, and a known diameter of an acceptable weld when applied at the center of a work piece. Finally, based upon the distance of the weld from the edge of the work piece, a failure criterion can be applied by comparing the distance of the weld from the edge to a minimum distance from the edge and identifying the weld as pass or fail based upon the comparison.

Once weld strength is estimated and a failed weld is detected, the particular welding station that applied the weld can be directed by automated programming to make corrective actions, such as applying a repair weld at a pre-determined secondary location on the work piece, or flagging the failed weld and alerting a line operator to address the quality issue manually. Alternatively, welds on a work piece may be visually inspected subsequent to the welding operation, and manual measurements of weld location and degree of overlap may be taken. This data will be entered into a weld station processor manually and the determination of weld success or failure will be made as described previously. A manually operated imaging device may also be utilized to detect weld distance to edge and degree of overlap. Regardless the method to determine weld location and degree of overlap, a processing device in the weld station can calculate the weld strength, or pre-calculated strength values can be accessed in a lookup table or production database.

An exemplary embodiment of an apparatus to accomplish the above described methods can include a control module monitoring inputs related to at least weld location, processing said inputs to determine or predict a weld strength based upon a distance to a closest edge of a work piece, and comparing the weld strength to a threshold weld strength. A control module can exist within a single device or can span a plurality of devices.

Figure 10:
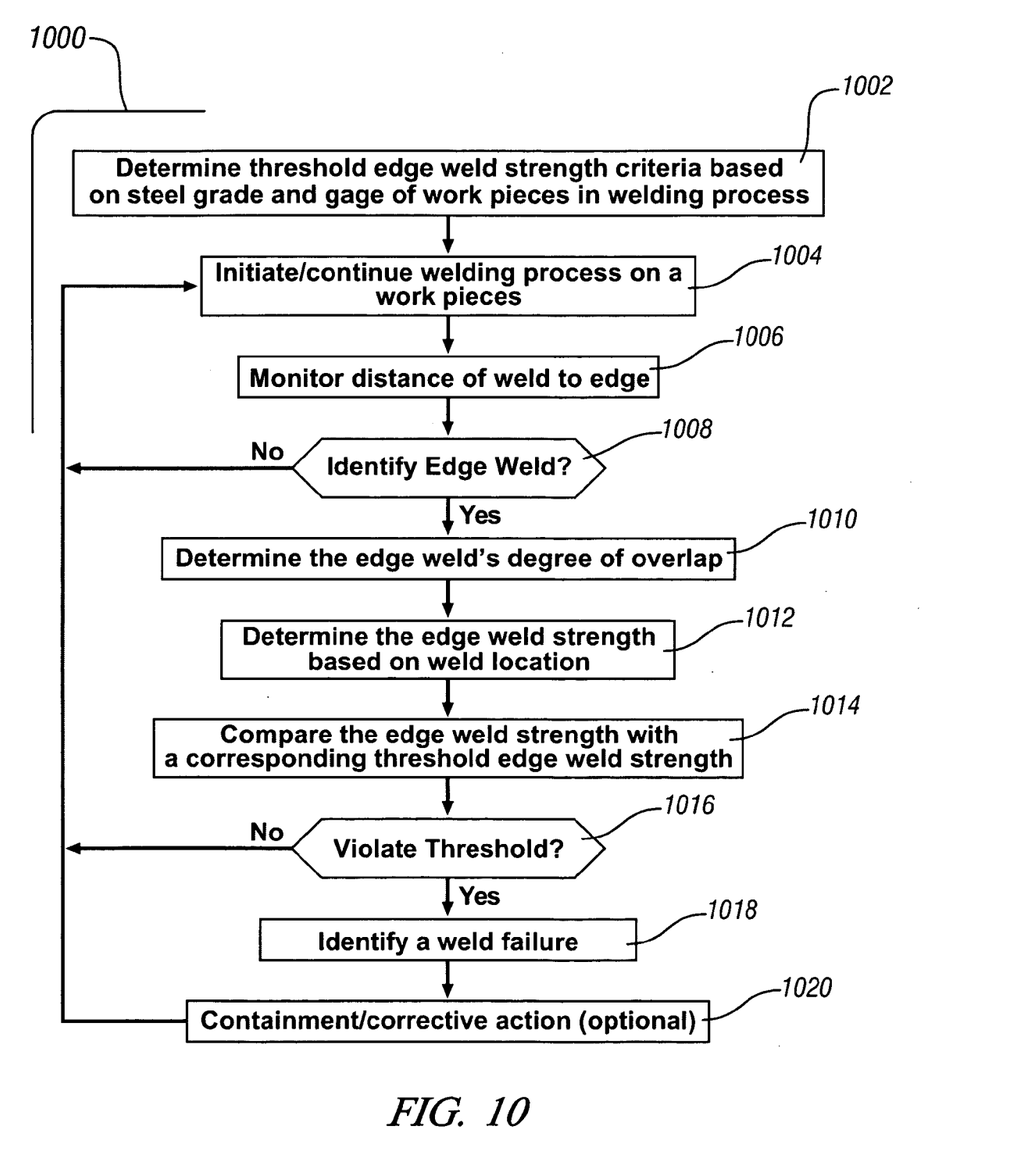
FIG. 10 is a flowchart demonstrating an exemplary process utilizing a method to diagnose weld strength in a resistance weld process based upon weld location in accordance with the present disclosure.

FIG. 10 illustrates process 1000 wherein an exemplary method to diagnose weld failure in a resistance welding process based on weld location is presented in accordance with the present disclosure. In step 1002, minimum allowable weld strength criteria is determined by considering the steel grade, gage, and configuration of all work pieces involved in a welding process and calculating a strength threshold for each weld joint, as previously discussed. A work piece may contain weld joints having dissimilar strength characteristics and a set of threshold strength values will need to be calculated, each threshold strength value designated for a specific weld in a unique location or over a unique coupon thickness. In step 1004, a set of work pieces are aligned in a manufacturing process and a resistance weld is performed upon the work pieces. In step 1006, a weld location monitoring system as described previously measures the distance of the applied weld to the nearest edge of the work pieces. A location assessment is made in step 1008. If the weld is detected in a substantially central position on the work piece the weld process continues as normal. If the weld's outer diameter is shown tangent to or in close proximity to the edge of the overlap of the work pieces the weld is identified as an edge weld. Once identified, the edge weld is examined further in step 1010 by the weld location monitoring system to determine the percentage of the weld area that remains over the layered work pieces, or the degree of overlap of the edge weld. When the degree of edge weld, coupon thickness, and yield strength of base material is known, a predicted weld strength is calculated in step 1012 using a formula or model created according to methods described above. In step 1014 the predicted weld strength is compared to a corresponding threshold weld strength developed in step 1002. A determination is made if the calculated weld strength violates the threshold weld strength. If the threshold has not been violated the weld process resumes as normal. If the threshold has been violated the weld is identified as a failure in step 1018. After a failed weld is identified the welding process can be stopped and containment or repair action can be implemented as indicated in optional step 1020. The weld station can adjust the welding gun containing the necessary electrodes and instrumentation used to measure weld position to a new location or a predetermined secondary location on the work piece to apply a repair weld. The detection of electrode location and control of movement may be generically set, may involve a recalibration to a coordinate system based on tooling or the part work piece, may be directed from the encoder of electric servomotor (i.e., servo gun) or other location sensing methods (LVDT and laser), or may employ other means to select the direction of movement. The weld location monitoring system will verify the electrodes are in a position to perform a repair weld. If the gun is determined to be in a proper location, then the process is reinitiated to step 1002. If the gun is determined to be in an improper location, then the weld gun is readjusted as was done at the beginning of step 1020 to find a proper location to perform a repair weld, or the weld location is skipped and containment actions are taken to ensure the quality of the next weld. Actions in 1020 may involve moving the gun by logic previously discussed, or an overall algorithm can be applied to determine the proper containment action. For example, a factor of safety could be employed in programming welds in a work piece, wherein if a single weld malfunction occurs during manufacture, the work piece is still deemed acceptable and no repair function is needed. Alternatively, a work piece with a failed weld can be flagged and put through a separate repair loop in the process, flagged and identified for individual inspection and repair off line, or otherwise contained.

The threshold weld strength is a value that will change from application to application and can be determined experimentally, empirically, predictively, through modeling or other techniques adequate to accurately predict resulting strength in the weld joint.

As described above, the above methods can be used to evaluate individual welds in isolation and diagnose each weld as a failed weld. However, the methods described herein can be used on an entire set of work pieces to diagnose a failed weld process. In such a use, individual welds can be monitored, and weld strengths determined. Failed welds can be either tracked or repaired. A determination can be made based upon compilation of the numerous individual welds regarding a resulting strength in the overall set of work pieces. Upon a critical number of failed welds or upon completion of the part, a diagnosis can be made that the resulting strength in the overall set of work pieces is less than a threshold required strength in the set of work pieces. Upon such a diagnosis, the set can be tracked, rejected, or repaired according to the particular methods employed.

This disclosure has described certain preferred embodiments and modifications thereto. Further modifications and alterations may occur to others upon reading and understanding the specification. Therefore, it is intended that this disclosure not be limited to the particular embodiment(s) disclosed as the best mode contemplated for carrying out this disclosure, but that the disclosure will include all embodiments falling within the scope of the appended claims.

The invention claimed is:

1. Method to diagnose a failed weld in a welding process, comprising:
   monitoring a location of a weld created on a plurality of work pieces;
   diagnosing said weld as a failed weld based on said location with respect to a closest edge of one of said work pieces; and
   identifying said failed weld based on said diagnosing;
   wherein said diagnosing said weld as a failed weld comprises:
   evaluating said location of said weld with respect to a distance from said closest edge; and
   diagnosing said failed weld based upon said evaluating; and
   wherein said evaluating said location of said weld with respect to a distance from said closest edge comprises:
   comparing said location of said weld to a nominal location of said weld; and
   diagnosing said failed weld if said location of said weld varies from said nominal location by more than a threshold maximum distance.

2. The method of claim 1, wherein said monitoring a location of said weld comprises utilizing a machine vision system.

3. The method of claim 1, wherein said monitoring a location of said weld comprises utilizing physical probes measuring location data.

4. The method of claim 1, wherein said monitoring a location of said weld comprises monitoring movement of welding machinery utilized to create said weld.

5. The method of claim 1, further comprising repairing said work pieces based upon said identifying said failed weld.

6. Method to diagnose a failed weld in a welding process, comprising:
   monitoring a location of a weld created on a plurality of work pieces;
   diagnosing said weld as a failed weld based on said location with respect to a closest edge of one of said work pieces; and
   identifying said failed weld based on said diagnosing;
   wherein said diagnosing said weld as a failed weld comprises:
   evaluating said location of said weld with respect to a distance from said closest edge; and diagnosing said failed weld based upon said evaluating; and wherein said evaluating said location of said weld with respect to a distance from said closest edge comprises:

comparing said location of said weld to a 3D model of said work pieces to determine a distance from said location of said weld to said closest edge; and diagnosing said failed weld if said distance is less than a threshold minimum distance from said closest edge.

7. Method to diagnose a failed weld in a welding process, comprising:

monitoring a location of a weld created on a plurality of work pieces;

diagnosing said weld as a failed weld based on said location with respect to a closest edge of one of said work pieces; and identifying said failed weld based on said diagnosing;

wherein said diagnosing said weld as a failed weld comprises:

evaluating said location of said weld with respect to a distance from said closest edge; and diagnosing said failed weld based upon said evaluating; and wherein said evaluating said location of said weld with respect to a distance from said closest edge comprises:

monitoring accepted weld location data from a data referencing device;

comparing said location of said weld to said accepted weld location data; and diagnosing said failed weld if said location of said weld violates said accepted weld location data.

8. Method to diagnose a failed weld in a welding process, comprising:

monitoring a location of a weld created on a plurality of work pieces;

diagnosing said weld as a failed weld based on said location with respect to a closest edge of one of said work pieces; and identifying said failed weld based on said diagnosing;

wherein said diagnosing said weld as a failed weld comprises:

determining a predicted weld strength based upon said location of said weld comparing said predicted weld strength to a required weld strength for said weld; and diagnosing said failed weld if said predicted weld strength is less than said required weld strength.

9. The method of claim 8, wherein said determining said predicted weld strength is based upon experimentally testing yield strength of samples of said work pieces welded in various locations.

10. The method of claim 8, wherein said determining said predicted weld strength is based upon modeling said work pieces and a resulting distance to said closest edge based upon said location of said weld.

11. The method of claim 10, wherein said modeling further comprises factoring material properties and predicted weld geometry based upon said location of said weld.

12. The method of claim 8, wherein said determining said predicted weld strength is further based upon a yield strength of a material of said work pieces and a coupon thickness of said work pieces.

13. Method to diagnose a failed weld in a welding process, comprising:

monitoring a location of a weld created on a plurality of work pieces;

diagnosing said weld as a failed weld based on said location with respect to a closest edge of one of said work pieces; and identifying said failed weld based on said diagnosing;

wherein said diagnosing said weld as a failed weld comprises:

evaluating said location of said weld with respect to a distance from said closest edge; and diagnosing said failed weld based upon said evaluating; and wherein said evaluating said location of said weld with respect to a distance from said closest edge comprises:

monitoring a defined safe zone for the weld;

comparing said location of said weld to said defined safe zone; and diagnosing said failed weld if said location of said weld is outside of said defined safe zone.

14. Method to diagnose a failed weld in a welding process, comprising:

monitoring a location of a weld created on a plurality of work pieces;

diagnosing said weld as a failed weld based on said location with respect to a closest edge of one of said work pieces; and identifying said failed weld based on said diagnosing;

wherein said diagnosing said weld as a failed weld comprises:

evaluating said location of said weld with respect to a distance from said closest edge; and diagnosing said failed weld based upon said evaluating; and wherein said evaluating said location of said weld with respect to a distance from said closest edge comprises:

monitoring a defined edge zone for the weld;

comparing said location of said weld to said defined edge zone; and diagnosing said failed weld if said location of said weld is inside of said defined edge zone.

15. Method to diagnose a failed welding process, comprising:

monitoring locations of a plurality of welds created on a set of work pieces;

determining a weld strength for each of said welds based on said locations with respect to a closest edge of one of said work pieces for each weld;

determining a resulting strength in said overall set of work pieces based upon compilation of said weld strengths; and identifying said failed weld process based on said resulting strength in said overall set of work pieces.

16. Apparatus to diagnose a weld failure in a welding process, comprising:

a control module, including programming to:

monitor a location of a weld created on a plurality of work pieces;

determine a distance from said location of said weld to a closest edge of said work pieces;

determine a predicted strength of said weld based upon said distance;

compare said predicted strength of said weld to a required strength of said weld; and diagnose said weld failure based upon said comparing.

17. The apparatus of claim 16, further comprising a machine vision system generating said location of said weld.

* * * * *